United States Patent [19]

Fuse

[11] Patent Number: 5,444,562
[45] Date of Patent: Aug. 22, 1995

[54] APPARATUS FOR TRANSMITTING AN INTENSITY-MODULATED LIGHT SIGNAL

[75] Inventor: Masaru Fuse, Toyonaka, Japan

[73] Assignee: Matsushita Electric Industries Co., Ltd., Osaka, Japan

[21] Appl. No.: 203,313

[22] Filed: Mar. 1, 1994

[30] Foreign Application Priority Data

Mar. 2, 1993 [JP] Japan .................................. 5-041014

[51] Int. Cl.6 ............................................ H04B 10/00
[52] U.S. Cl. .................................. 359/161; 359/173; 359/188
[58] Field of Search ............... 359/111, 153, 156, 154, 359/161, 173, 183, 188, 195; 385/28

[56] References Cited

FOREIGN PATENT DOCUMENTS

| | | | |
|---|---|---|---|
| 0503579 | 9/1992 | European Pat. Off. ............ | 359/188 |
| 0565035 | 10/1993 | European Pat. Off. ............ | 359/183 |
| 0030232 | 1/1990 | Japan ................................. | 359/161 |
| 2007430 | 4/1992 | WIPO ................................ | 359/188 |

*Primary Examiner*—Leo H. Boudreau
*Assistant Examiner*—Kinfe-Michael Negash
*Attorney, Agent, or Firm*—Beveridge, DeGrandi, Weilacher & Young

[57] ABSTRACT

An optical transmission apparatus has an electro-optic converter device which converts an electrical signal into an intensity-modulated light signal in such a way that the amount of wavelength chirping is less than a given amount. Therefore a first optical fiber transmission path can convey the signal over a long distance with a small amount of waveform distortion. An optical property change device changes an optical property of the light signal sent from the first optical fiber transmission path. Therefore a second optical fiber transmission path can transmit the changed light signal to demanders' opto-electronic converter device while alleviating waveform distortion due to interference of plural light waves. The light signal is reconverted into an electrical signal.

16 Claims, 3 Drawing Sheets

APPARATUS FOR TRANSMITTING AN INTENSITY-MODULATED LIGHT SIGNAL

BACKGROUND OF THE INVENTION

1. Field of the Invention

The present invention relates to transmission of an intensity-modulated light signal and, more particularly, to an apparatus for transmitting low-distortion, high-quality light signals over long distances.

2. Description of the Related Art

Optical transmission using optical fibers as transmission media has been known as a method especially adapted for long-distance transmission because of their low losses. Methods of converting electrical signals into light signals are roughly classified into direct modulation and external modulation. At present, the direct modulation method prevails because of its low cost. This direct modulation method chiefly uses a semiconductor laser as a light source. The electrical current injected into this laser is amplitude-modulated by an electrical signal which should be sent. In this way, the intensity of the output light is modulated and converted into a light signal.

As mentioned above, optical transmission is intrinsically suited for long-distance transmission because of low losses of optical fibers. However, where a light signal is transmitted by the direct modulation method, the wavelength of the light signal is distorted, especially in long-distance transmission. This severely limits the transmission distance. The main causes of distortions of light signals are described below.

One cause is that chirping, or fluctuations of the wavelength, of a semiconductor laser used as a light source is affected by the wavelength-dependence of the optical transmission characteristics of optical fiber paths and produces distortions. See M. R. Philips et al., "Nonlinear distortion from fiber dispersion of chirped intensity modulated signals", OFC'91,TuC4,p10,1991. As described above, the output light intensity is modulated by modulating the current injected into the semiconductor laser. Generally, a semiconductor laser is designed so that it oscillates at a single wavelength. However, if the injected current is varied, the oscillation wavelength is varied too. On the other hand, optical transmission paths consisting of optical fibers often have characteristics including transmission loss and transmission velocity which are affected by the light wavelength. Accordingly, if an intensity-modulated light signal involving wavelength used chirping as described above is transmitted by the use of an optical transmission path as mentioned above, light signal transmission loss and transmission velocity vary, depending on the intensity of the light signal, thus resulting in waveform distortions. Also, where an optical fiber amplifier is used, the gain of the amplifier has dependence on the wavelength and so if a light signal emitted from a semiconductor laser involving a large amount of chirping is amplified, then the waveform of the output light is distorted strongly.

A second cause is a distortion caused by interference of plural light signals which reach an opto-electronic converter device via their respective paths provided that reflection points exist in an optical transmission path. See J. H. Angenet et al., "Distortion of a multicarrier signal due to optical reflections.", ECOC91&I-OOC, WeC8-4, pp569–571,1991. For example, as shown in FIG. 4, if plural reflection points R1 and R2 exist in an optical transmission path, one conceivable light signal incident on the light-receiving device of the opto-electronic converter device is light L1 coming directly from the light-emitting device of the electro-optic converter device. Another conceivable light signal incident on the light-receiving device is light L2 which reaches this receiving device after being reflected at the reflection point R2 and then at the reflection point R1. When two waves of light enter the light-receiving device in this way, if the correlation between the phases of the two waves is large, i.e., if the phase difference between the two waves is small, then interference occurs, producing a distortion.

The conceivable main causes of distortions in the prior art optical transmission apparatuses are the two factors described above. In order to prevent distortions due to the first factor, a semiconductor laser which produces a small amount of chirping when directly modulated should be used. Distortions attributed to the second factor can be effectively prevented by transmitting signals by means of light having a wide optical spectral line width because, if the optical spectral line width is wide, the probability that the two light signals L1 and L2 shown in FIG. 4 are the same in phase is low.

However, a semiconductor laser which is designed so that the amount of chirping is small has a narrow optical spectral line width because of its structure. Consequently, it is very difficult to develop a semiconductor laser which satisfies these two conditions simultaneously.

Generally, fiber-optic transmission paths used as main lines in an optical transmission-and-distribution network may be used to convey signals over long distances. Therefore, if the amount of chirping of transmitted light is large, that is, if the optical spectral line width is wide, waveform distortions caused by the wavelength dependence of transmission loss of the optical fiber paths and by the dispersion characteristics (i.e., the dependence of the transmission velocity on wavelength) produce greater effects. In contrast, optical fiber paths of a distribution system which branches off from a main line and is laid to each optical subscriber are comparatively short. Therefore, even if the amount of chirping is large ,that is, the optical spectral line width of the transmitted light is wide, waveform distortions due to the above-described transmission characteristics of the optical fibers are small.

Since high-performance components are not used as optical devices and optical terminals connected to the optical fiber transmission paths of the distribution system because of limitations imposed on the costs, the used optical components may be cheap ones which do not have a large amount of return losses. In this case, if the optical spectral line width of the transmitted light is wide, distortions due to multiple reflections of light as described in connection with FIG. 4 can be reduced to a minimum.

Because of the characteristics of the optical transmission paths described thus far, the optical spectral line width of transmitted light preferably has two conflicting characteristics, i.e., the line width is narrow in long-distance fiber-optic transmission paths of main lines and wide in low-quality optic-fiber transmission paths of distribution systems.

SUMMARY OF THE INVENTION

It is an object of the present invention to provide an optical transmission apparatus with low distortions by alleviating waveform distortions due to the wavelength-dependence of transmission loss and wavelength dispersion characteristics of long-distance fiber-optic transmission paths of main lines and suppressing distortions due to multiple reflections in fiber-optic transmission paths of a distribution system, wherein inexpensive optical parts having small amounts of return loss are connected.

The above object is achieved in accordance with the teachings of the invention by an optical transmission apparatus comprising:

an electro-optic converter means for converting an electrical signal into a light signal with an amount of chirping less than a given amount;

a first optical transmission path for conveying the light signal converted by the electro-optic converter means;

a second optical transmission path which is connected with the first optical transmission path and in which said light signal is distorted more strongly due to generation of reflected light waves and interference with the reflected light waves than in the first optical transmission path;

opto-electronic converter means connected with the second optical transmission path and acting to reconvert the light signal incident on this converter means into an electrical signal; and an optical property change means located close to a junction of said first and second optical transmission paths and acting to change an optical property of the transmitted light signal, for reducing waveform distortion of said light signal due to said generation and interference of reflected light in said second optical transmission path.

An example of the optical property change means is an optical spectral line width-enlarging means or a light polarization plane-modulating means. The optical spectral line width-enlarging means comprises a modulating signal-generating means for generating an electrical signal whose amplitude varies with time and an external light phase-modulating means for phase-modulating light waves according to the magnitude of the electrical signal. The light polarization plane-modulating means comprises said modulating signal-generating means and an external light polarization plane-modulating means for modulating the state of polarization of light waves according to the magnitude of the electrical signal. Preferably, the electrical signal, which varies with time contains numerous frequency components such as white noise.

In the above-described structure of the invention, the electro-optic means converts an electrical signal into a light signal having an amount of chirping less than a given amount. When this light signal is conveyed over a long distance through the first optical transmission path, this path alleviates distortion of the waveform due to the transmission characteristics, for example the dispersion characteristics depending on wavelength of the first optical transmission path. The optical property change means modifies the optical property of the optical wave transmitted. When this optical wave is conveyed via the second optical transmission path, this second optical transmission path prevents distortion due to interference of plural light waves. Thus, light signals are sent with low distortion.

DESCRIPTION OF THE PREFERRED EMBODIMENTS

Figure 1:
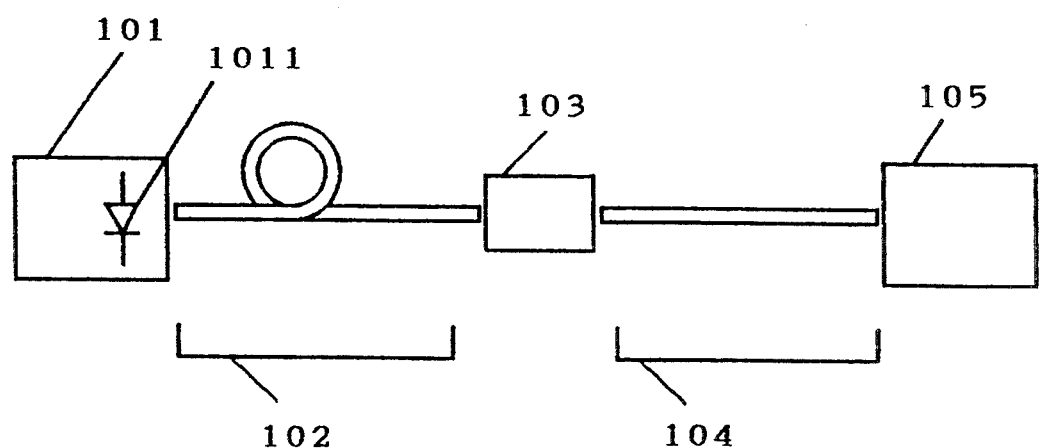
FIG. 1 is a block diagram of an optical transmission apparatus according to the present invention.

One embodiment of the invention is hereinafter described by referring to the drawings. FIG. 1 is a block diagram showing the structure of an optical transmission apparatus according to the invention. This apparatus comprises an electro-optic converter device 101 which has a semiconductor laser 1011 as a light source. The converter device converts an electrical signal into a light signal whose intensity is modulated. This light signal is sent to a main fiber-optic transmission path 102. The light signal propagated through the main fiber-optic transmission path 102 is applied to an optical spectral line width-enlarging device 103. This line width-enlarging device 103 enlarges the optical spectral line width of the incoming light signal and then transfers the signal to a sub fiber-optic transmission path 104. The light signal transmitted through the sub fiber-optic transmission path 104 is applied to an opto-electronic converter devices 105 connected with the terminal of the sub fiber-optic transmission path 104. The converter devices 105 reconvert the received light signal into an electrical signal.

Figure 2:
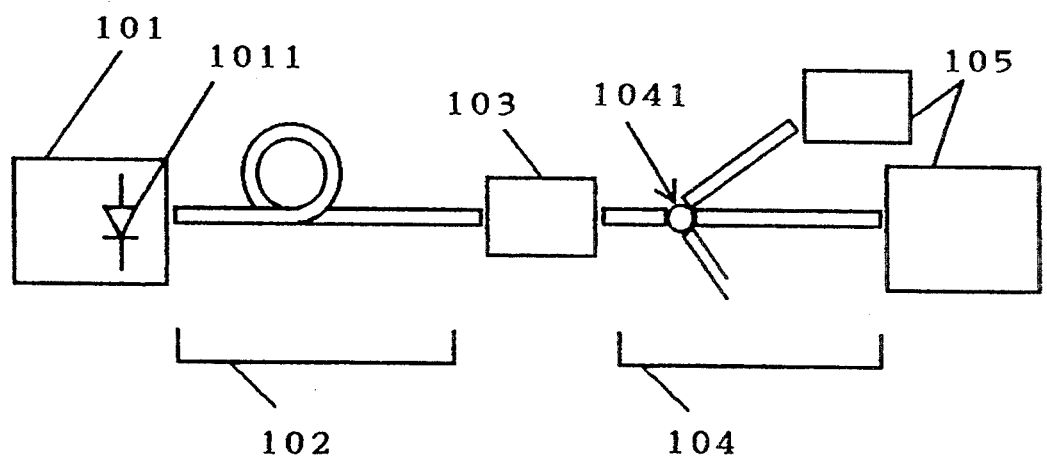
FIG. 2 is a block diagram similar to the optical transmission apparatus shown in FIG. 1, but in which a plurality of parties demand the same light signal.

FIG. 2 is a block diagram of one example of the optical transmission apparatus according to the invention, and in which a plurality of parties demand the same light signal. This apparatus is similar in structure to the apparatus shown in FIG. 1 except that an optical distributor 1041 is installed in the sub fiber-optic transmission path 104 to distribute the light signal according to the number of demanders.

Figure 3:
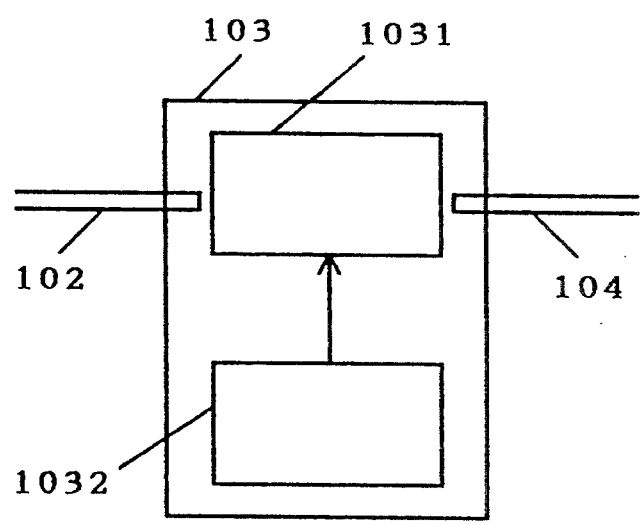
FIG. 3 is a block diagram of an optical property change means of an optical transmission apparatus according to the invention.
Figure 4:
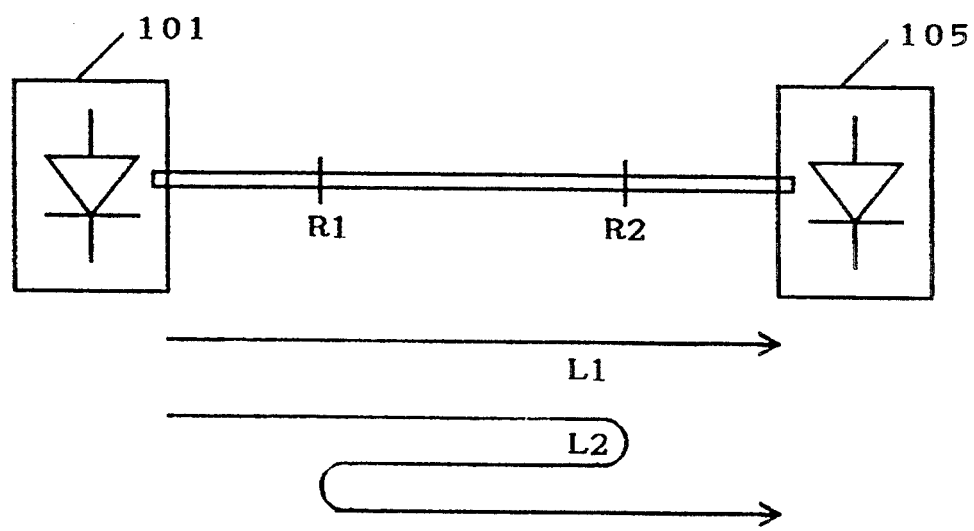
FIG. 4 is a schematic diagram of an optical fiber transmission path, illustrating interference of plural light waves due to multiple reflections.

FIG. 3 is a block diagram showing the structure of the above-described optical spectral line width-enlarging device 103. This line width-enlarging device comprises an external light phase-modulating device 1031 for phase-modulating light waves and a modulating signal-generating device 1032 for supplying a modulating signal to the external light phase-modulating device 1031. For example, an optical phase modulator fabricated by forming a Ti-diffused waveguide on a LiNbO$_3$ substrate can be used as the external light phase-modulating device 1031. This modulates the phases of light waves according to the magnitude of the applied electrical, or voltage, signal.

The above-described main fiber-optic transmission path 102 forms a first optical transmission line. The sub fiber-optic transmission line 104 forms a second optical transmission path. The optical spectral line widthenlarging device 103 forms an optical property change means.

The operation of the optical transmission apparatus constructed as described above is described now. The electro-optic converter device 101 modulates the electrical current injected into the semiconductor laser 1011 with an electrical signal to be transmitted to thereby deliver an intensity-modulated light signal. In long-distance transmission over optical fibers, a semiconductor laser which produces an amount of chirping less than a given amount on modulation is used as the semiconductor laser 1011 to suppress deterioration of the waveform of the light signal either due to wavelength-dependence of the transmission loss or due to the wavelength dispersion characteristics. Therefore, this light signal is transmitted over a long distance via the main fiber-optic transmission path 102 with small waveform distortion. Then this light signal is applied to the optical spectral line width-enlarging device 103. In the line width-enlarging device 103, the modulating signal-generating device 1032 produces a given voltage signal to the external light phase-modulating device 1031, the voltage signal varying with time. In this way, the phase of the incoming light signal is modulated, and the optical spectral line width of the light is enlarged. The light signal produced from the line width-enlarging device 103 is transmitted through the sub fiber-optic transmission line 104 and applied to the opto-electronic converter device 105. If plural parties demand this light signal, the optical distributor 1041 in the sub fiber-optic transmission line 104 divides the light signal into a given number of devices according to the number of the demanding parties and distributes them to the given number of opto-electronic converter devices 105. Since the optical spectral line width of the light signal propagated through the sub fiber-optic transmission line 104 has been enlarged by the optical spectral line width-enlarging device 103 as described above, waveform deterioration due to interference of plural light waves is suppressed even if optical components used in optical devices connected with the sub fiber-optic transmission line 104, such as the opto-electronic converter devices 105, produce reflected light without large amounts of return losses or attenuating light by large amounts. Hence, the transmitted light signal is less deteriorated in quality. Meanwhile the effect of the optical transmission characteristics of the sub fiber-optic transmission line 104, such as the dispersion characteristics becomes large by enlarging the optical spectral line width, but the degradation of the transmission quality is small enough because of the short length of the sub fiber-optic transmission line 104.

The modulating signal supplied from the modulating signal-generating device 1032 may be a voltage signal which varies with time, as mentioned previously, but a modulating signal containing numerous frequency components, such as white noise, is most adequate as the modulating signal.

Let $\Delta v_o$ be the optical line width of the light source. An intermodulation is caused by multiple reflections provided that two reflection points exist in the sub fiber-optic transmission line 104. In order to reduce the amount of the intermodulation by more than x dB, the spectral line width is enlarged by the optical spectral line width-enlarging device 103 in such a way that the ratio of enlargement $\alpha$ (i.e., the ratio of the output optical spectral line width to the input optical spectral line width) satisfies the relation $$\alpha \geq 1 + \frac{x}{10} \cdot \frac{v}{2\pi L \cdot \Delta v_0} \cdot \log_{10} e$$

where x is the amount (in dB) by which the intermodulation distortion has been improved, v is the light velocity (approximately equal to $2\times 10^8$ m/sec) in optical fibers, L is the distance (in meters) between the closest reflection points in the sub fiber-optic transmission line 104, and $\Delta v_o$ is the optical spectral line width (in Hz) of the light source used in the electro-optic converter device 101. It is assumed that the optical spectral line width $\Delta v_o = 4$ MHz and that the distance L=1 m. In order to improve the intermodulation distortion by more than 10 dB, the optical spectral line width-enlarging device 103 enlarges the optical spectral line width to more than about 18 MHz.

Figure 5:
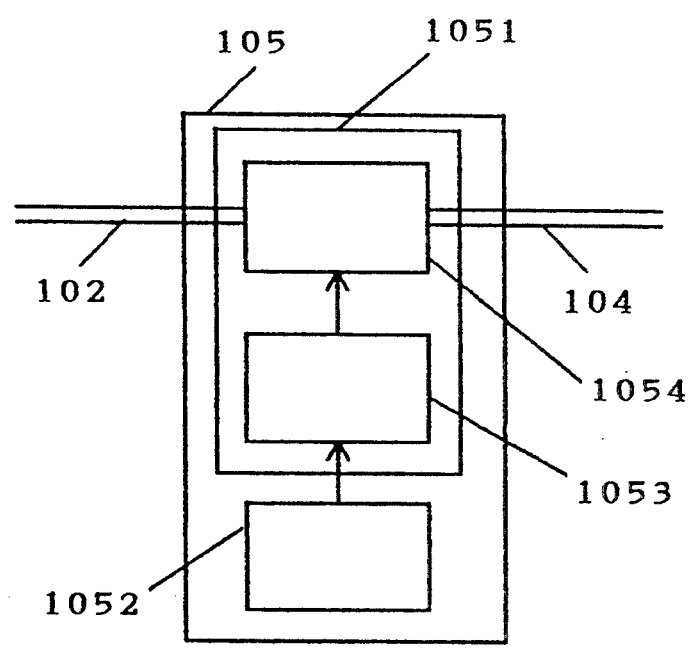
FIG. 5 is a block diagram of an optical property change means of an optical transmission apparatus according to the invention.

In the above embodiment, the optical spectral line width-enlarging device 103 shown in FIG. 3 is used as a light property change means, and the correlation between the phases of plural light waves in the sub fiber-optic transmission line 104 is reduced to suppress distortion due to interference of these light waves. Instead of the optical spectral line width-enlarging device acting as an optical property change means, an optical polarization plane-modulating means may be used which modulates the states of polarization of light signals so as to reduce the correlation between the states of polarization of plural light waves, thus preventing distortion. This is accomplished by providing an external optical polarization plane-modulating device 1051 and a modulating signal-generating device 1052 shown in FIG. 5. A structure comprising a force generating device 1053 for converting a modulating signal to a mechanical force, and a press device 1054 for adding the force to a side of the optical fiber, may be used as the external polarization plane-modulating device 1051 as described in the document "Supervisory Signal Transmission For Optical Amplifier Using Polarization Modulators", Kagi and et al., Technical Research Report OQE92-121 of the Electronic Information Transmission Society of Japan, pp. 31–36, Nov. 1992. Preferably, a signal such as white noise is used as a polarization plane-modulating signal in the same way as in the case of the above-described phase-modulating signal.

Furthermore, in the above embodiment, an optical property change means, such as an optical spectral line width-enlarging device or an optical polarization plane-modulating device, is disposed at the junction of the main fiber-optic transmission path 102 and the sub fiber-optic transmission line 104. The present invention is not limited to this configuration. The optical property change means may also be positioned close to the junction, in which case waveform deterioration of light signal in the main fiber-optic transmission line 102 and the sub fiber-optic transmission line 104 can be suppressed more effectively with reducing the distance to the junction.

What is claimed is:
1. An optical transmission apparatus comprising:
an electro-optic converter means for converting an electrical signal into a light signal;
a first optical fiber transmission path for conveying said light signal;
opto-electronic converter means for reconverting an incoming light signal into an electrical signal;

a second optical fiber transmission path which is connected between said first optical fiber transmission path and said opto-electronic converter means and in which a waveform of said light signal is distorted more strongly due to generation of reflected waves and interference with the reflected waves than in the first optical fiber transmission path; and an optical property changing means located close to a junction of said first and second optical fiber transmission paths and acting to change an optical property of said transmitted light signal, for reducing waveform distortion in said second optical fiber transmission path.

2. The optical transmission apparatus in accordance with claim 1, wherein said optical property changing means is an optical spectral line width-enlarging means for enlarging an optical spectral line width of said light signal, and the first optical fiber transmission path is longer than the second optical fiber transmission path.

3. The optical transmission apparatus in accordance with claim 2, wherein said optical spectral line width-enlarging means comprises:

a modulating signal-generating means for generating a modulating signal, and an external light phase-modulating means for phase-modulating said light signal according to said modulating signal.

4. The optical transmission apparatus in accordance with claim 2, wherein said optical spectral line width-enlarging means comprises:

a modulating signal-generating means for generating a white noise signal, and an external light phase-modulating means for phase-modulating said light signal according to said white noise signal.

5. The optical transmission apparatus in accordance with claim 2, wherein when the optical spectral line width of said light signal produced from said electro-optic converter means is $\Delta \nu_o$ (in Hz), in order to attenuate, by more than x (in dB), an amount of intermodulation distortion caused by a presence of two reflecting points at a distance of L (in meters) in said second optical fiber transmission path, a factor, corresponding to a ratio of output to input, at which the optical spectral line width is enlarged by said optical spectral line width-enlarging means is set to equal to or larger than:

$$1 + \frac{x}{10} \cdot \frac{V_{inside}}{2\pi L \cdot \Delta \nu_o} \cdot \log_{10} e$$

where $V_{inside}$ is light velocity inside optical fibers.

6. The optical transmission apparatus in accordance with claim 1, wherein said optical property changing means is an optical polarization plane-modulating means for modulating a state of polarization of said light signal, and the first optical fiber transmission path is longer than the second optical fiber transmission path.

7. The optical transmission apparatus in accordance with claim 6, wherein said optical polarization plane-modulating means comprises:

a modulating signal-generating means for generating a modulating signal; and an external optical polarization phase-modulating means for modulating the state of polarization of said light signal according to said modulating signal.

8. The optical transmission apparatus in accordance with claim 6, wherein said optical polarization plane-modulating means comprises:

a modulating signal-generating means for generating a white noise signal; and an external optical polarization plane modulating means for modulating the state of polarization of said light signal according to said white noise signal.

9. An optical transmission apparatus comprising:

an electro-optic converter means for converting an electrical signal into a light signal having a first spectral bandwidth;

a first optical fiber transmission path for conveying a light signal converted by said electro-optic converter means;

an optical property changing means which receives a light signal from said first optical fiber transmission path and changes an optical property of said light signal to thereby provide a light signal having a spectral bandwidth larger than said first spectral bandwidth;

a second optical fiber transmission path for transmitting a light signal provided by said changing means; and opto-electronic converter means for receiving a light signal from said second optical fiber transmission path and reconverting such light signal into an electrical signal;

wherein light having said first spectral bandwidth undergoes low dispersion distortion in said first optical fiber transmission path as compared to said second optical fiber transmission path, and light having said second spectral bandwidth undergoes low reflection distortion in said second optical fiber transmission path as compared to said first optical fiber transmission path.

10. The optical transmission apparatus in accordance with claim 9, wherein the first optical fiber transmission path is longer than the second optical fiber transmission path.

11. The optical transmission apparatus in accordance with claim 9, wherein said optical property changing means includes a modulating signal-generating means for generating a modulating signal, and an external light phase-modulating means for phase-modulating the light signal according to said modulating signal.

12. The optical transmission apparatus in accordance with claim 9, wherein said optical property changing means includes a modulating signal-generating means for generating a white noise signal, and an external light phase-modulating means for phase-modulating the light signal according to said white noise signal.

13. The optical transmission apparatus in accordance with claim 9, wherein when the first spectral bandwidth of a light signal produced by said electro-optic converter means is $\Delta \nu_o$ (in Hz), in order to attenuate, by more than x (in dB), an amount of intermodulation distortion caused by a presence of two reflecting points at a distance of L (in meters) in said second optical fiber transmission path, a factor, corresponding to a ratio of output to input, at which the optical spectral line width is enlarged by said optical property changing means is set to equal to or larger than:

$$1 + \frac{x}{10} \cdot \frac{V_{inside}}{2\pi L \cdot \Delta v_o} \cdot \log_{10} e$$

where $V_{inside}$ is light velocity inside optical fibers.

14. The optical transmission apparatus in accordance with claim 9, wherein said optical property changing means is an optical polarization plane-modulating means, and the first optical fiber transmission path is longer than the second optical fiber transmission path.

15. The optical transmission apparatus in accordance with claim 14, wherein said optical polarization plane-modulating means includes a modulating signal-generating means for generating a modulating signal, and an external optical polarization phase-modulating means for modulating light according to said modulating signal.

16. The optical transmission apparatus in accordance with claim 14, wherein said optical polarization plane-modulating means includes a modulating signal-generating means for generating a white noise signal, and an external optical polarization plane modulating means.

* * * * *